(12) United States Patent
Mihalcheon

(10) Patent No.: US 10,475,114 B2
(45) Date of Patent: Nov. 12, 2019

(54) ON-LINE PRODUCT CATALOGUE AND ORDERING SYSTEM, AND THE PRESENTATION OF AUDIO TRACKS AND USER AVATARS ALONG A JOURNEY PATH

(71) Applicant: Outersonic Limited, London (GB)

(72) Inventor: Gregory Arthur Mihalcheon, London (GB)

(73) Assignee: Outersonic Limited, London (GB)

( * ) Notice: Subject to any disclaimer, the term of this patent is extended or adjusted under 35 U.S.C. 154(b) by 695 days.

(21) Appl. No.: 14/587,386

(22) Filed: Dec. 31, 2014

(65) Prior Publication Data

US 2015/0142619 A1 May 21, 2015

Related U.S. Application Data

(63) Continuation of application No. 13/051,663, filed on Mar. 18, 2011, now abandoned, which is a (Continued)

(30) Foreign Application Priority Data

Mar. 2, 2000 (GB) .................................. 0005083.1

(51) Int. Cl.
*G06Q 30/06* (2012.01)
*G06F 3/0481* (2013.01)
(Continued)

(52) U.S. Cl.
CPC ..... *G06Q 30/0643* (2013.01); *G06F 3/04815* (2013.01); *G06F 16/90328* (2019.01);
(Continued)

(58) Field of Classification Search
CPC ......... G06Q 30/06–0645; G06Q 50/01; G06Q 30/08; G06F 16/90328; G06F 16/954; G06F 3/04815
(Continued)

(56) References Cited

U.S. PATENT DOCUMENTS 5,634,129 A * 5/1997 Dickinson .............. G06Q 10/10
719/315
5,918,213 A 6/1999 Bernard et al.
(Continued)

FOREIGN PATENT DOCUMENTS

EP 0753836 1/1997
EP 0902383 3/1999
(Continued)

OTHER PUBLICATIONS

Life at the Palace, a Cyberpsychology Case Study, www.rider.edu/users/suler/psycyber/palacestudy.html, Feb. 25, 2002, 1 page.

*Primary Examiner* — Adam L Levine
(74) *Attorney, Agent, or Firm* — Andrus Intellectual Property Law, LLP

(57) ABSTRACT

A method of presenting an on-line product catalog and ordering system to a user, said method comprising providing a graphical user interface representing a virtual space through which users may navigate, said virtual space including representations representing products, through which a user may obtain product information and order a product on-line, and representations representing other users of the system, through which the user may identify such other users and communicate with a selected other user regarding the products on offer.

15 Claims, 9 Drawing Sheets

Related U.S. Application Data continuation of application No. 12/041,439, filed on Mar. 3, 2008, now abandoned, which is a continuation of application No. 10/220,378, filed as application No. PCT/GB01/00912 on Mar. 2, 2001, now abandoned.

(51) Int. Cl.
*G06F 16/9032* (2019.01)
*G06F 16/954* (2019.01)

(52) U.S. Cl.
CPC ............ *G06F 16/954* (2019.01); *G06Q 30/06* (2013.01); *G06Q 30/0601* (2013.01)

(58) Field of Classification Search
USPC .......................................... 705/26–27.2, 319
See application file for complete search history.

(56) References Cited

U.S. PATENT DOCUMENTS

| | | | |
|---|---|---|---|
| 6,478,830 B2 | 11/2002 | Farmer et al. | |
| 8,566,250 B2 * | 10/2013 | Russell | G06Q 20/00 340/5.52 |
| 2004/0044627 A1 * | 3/2004 | Russell | G06Q 20/00 705/50 |

FOREIGN PATENT DOCUMENTS

| | | |
|---|---|---|
| WO | 97/28510 | 8/1997 |
| WO | 00/43904 | 7/2000 |
| WO | 01/46840 | 6/2001 |

* cited by examiner

ON-LINE PRODUCT CATALOGUE AND ORDERING SYSTEM, AND THE PRESENTATION OF AUDIO TRACKS AND USER AVATARS ALONG A JOURNEY PATH

CROSS REFERENCE TO RELATED APPLICATION

This application is a continuation of U.S. patent application Ser. No. 13/051,663, filed Mar. 18, 2011, which is a continuation of U.S. patent application Ser. No. 12/041,439, filed Mar. 3, 2008, which is a continuation of U.S. patent application Ser. No. 10/220,378, filed Nov. 27, 2002, which is the U.S. national stage application of International Application PCT/GB2001/000912 filed Mar. 2, 2001, which International Application was published on Sep. 7, 2001 as International Publication WO01/65346 in the English language. The International Application claims priority of Great Britain Patent Application 0005083.1, filed Mar. 2, 2000, the contents of which are incorporated herein by reference in their entireties.

BACKGROUND OF THE INVENTION

This invention relates to an on-line product catalogue and ordering system and to presenting multimedia content to a user. The invention provides a multi-user system, and a graphical user interface representing a virtual space through which a user may navigate. In particular, but not exclusively, the invention relates to the presentation of multimedia content and on-line product ordering via the World Wide Web ("the Web").

Real places are sensed in combination with other people present. Sensations of the same place can vary from bustling to barren depending on the amount of people present. On the other hand, the Web can be an alienating and insular experience. Often, many people can be working at the same time on the Web, without the opportunity to ask each other questions, or sense that someone else is interested in the same area. Some on-line product catalogue and ordering Web sites have attempted to address this problem. For example, Amazon.com™, one such site, has instituted "purchase circles" allowing prospective purchasers to access bestseller lists grouped according to selected communities. These communities are based on a geographical location, workplace, etc.

U.S. Pat. No. 5,960,173 describes a system in which network computer users are provided with information about which other users are "task proximate" to the user, thereby facilitating spontaneous communications regarding task-related, or other issues. The information about other users is displayed in a user interface window, which presents a visual representation of each other user who is "task proximate" to the user. A drawback of the arrangement described in this patent is that information regarding the "task proximate" users is always displayed in the same manner, in a separate window, irrespective of the "task" which the user is performing, which can be disorienting. In addition, the progress of any other user within the task is not readily determined without actually communicating with that other user.

Also known are "Multi-User Virtual Environments" (MUVEs), in which on-line users may navigate through a virtual space, see other users within the same space and communicate with such other users by means of a multi-user chat application. These are intended to allow users to work on projects collaboratively, for teaching purposes, or simply for social interaction.

In accordance with one aspect of the invention, there is provided a method of presenting an on-line product catalogue and ordering system to a user, said method comprising providing a graphical user interface representing a virtual space through which users may navigate, said virtual space including representations representing products, through which a user may obtain product information and order a product on-line, and representations representing other users of the system, through which the user may identify such other users and communicate with a selected other user regarding the products on offer.

SUMMARY OF THE INVENTION

In accordance with a further aspect of the present invention, there is provided a method of presenting multimedia content to a user of a multi-user system, said method comprising providing a graphical user interface representing a virtual space through which a user may navigate, said virtual space including representations of a plurality of multimedia resources and representations of one or more users, wherein said one or more user representations are represented in a relationship with a representation of a first multimedia resource in said virtual space when selecting or accessing said first resource, and represented in a relationship with a representation of a second multimedia resource in said virtual space when selecting or accessing said second resource.

Embodiments of the present invention allow a user to detect and interact with other users present within the virtual space in which the user resides, in conjunction with obtaining knowledge regarding resources being accessed or selected by such other users.

In one embodiment a user is able to roam around at least one virtual space representing a product catalogue. Residing within this space is an avatar of the user accessing the data in that location. The avatar can be a default representation or one chosen by the user. By clicking on the avatar of another user, a user will see an identity card which shows who the person is, and how to get in touch with them. A chat space is provided where the user can ask other users present in the space questions pertinent to the products on offer, or other information being accessed by both parties.

In accordance with a further aspect of the invention, there is provided a method of presenting on-line audio content from a multi-user system to a user, said method comprising:

receiving audio data via a data network;

representing the position of the user within a sequence of audio content on a graphical user interface; and representing the location of other users of the system within said sequence of audio content on said graphical user interface.

In accordance with a yet further aspect of the invention, there is provided a method of transmitting on-line audio content from a multi-user system, said method comprising:

transmitting audio data from a sequence of audio content via a data network to a user; and transmitting data indicating the location of other users of the system within said sequence of audio content to said user via said data network.

The audio data is preferably streamed to the user, whereby the position of all users of a multi-user system within individual audio tracks is readily determined on a server providing audio and multi-user data.

A preferred embodiment of the present invention will now be described, by way of example only, with reference to the accompanying drawings, wherein:

DETAILED DESCRIPTION OF THE DRAWINGS

Figure 1:
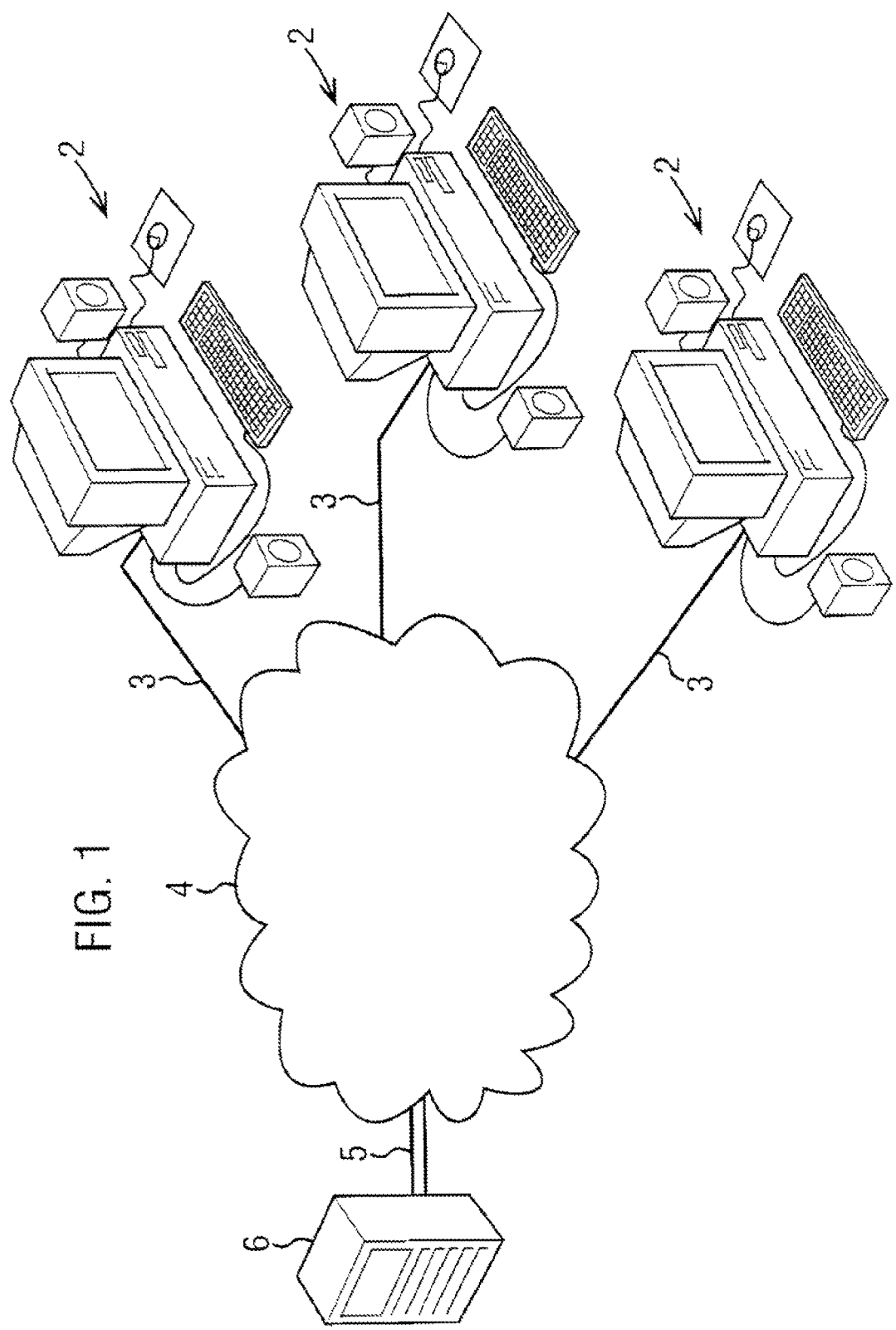
FIG. 1 is a schematic illustration of a network configuration used in an embodiment of the invention.

Referring to FIG. 1, in accordance with an embodiment of the invention, a plurality of users at user terminals 2 receive multimedia content via relatively low-bandwidth datalinks 3 such as ISDN links, and a public data network 4, in this embodiment the Internet, or an intranet, from a data processing server 6 which is connected to the Internet 4 by means of a relatively high bandwidth connection 5, such as an ATM link.

Each client terminal 2 includes a computer workstation having a graphical display, data input means such as a keyboard and a pointing device, e.g. a mouse, and an audio output means such as stereo loudspeakers. Each of the client terminals 2 includes a computer program in the form of an Internet browser which is enabled with an interactive media player, such as a Shockwave™ interactive media player produced by Macromedia™.

The data processing server 6 includes various interworking computer programs, including a multi-user server program, such as that provided by Macromedia™, a database program, such as an oracle database, a Web server program for storing and enabling clients to retrieve multimedia resources such as HTML pages and image files as well as an interactive multimedia program, in this embodiment a Shockwave™ movie. The server 6 also includes a streaming audio server program, such as a Real™ server for storing and transmitting streamed audio on request to a client. In addition, a customized control program resides on the server 6 and interworks with the multi-user server, for controlling multi-user aspects specific to the multi-user aspects of the interactive multimedia program downloaded to client terminals, when in use. The interactive multimedia program itself, along with the control program relying on the server 6 are object-oriented computer programs written in the object-oriented programming language Lingo™ used with the Macromedia product range.

When a user wishes to access multimedia content from the data processing server 6, using the client-resident browser, the user first requests the Shockwave movie from the Web server in the data processing server 6, and downloads same. Next, dynamic information presented to the user in the movie is downloaded from the database application, and the Shockwave movie is run with information populated from the database. The user initially starts with a default location in the movie, and can navigate through the movie by selecting different types of content which is imported from the server 6. In addition, multi-user-related content is continually updated by the streaming of control data from the multi-user server to the multimedia client terminal. Audio content is streamed from the streaming audio server to the client terminal.

In the present embodiment, the user is provided with a selection of different virtual spaces whereby to navigate through the multimedia content provided by the server 6, and to interact with different user groups.

One type of virtual space provided by the movie is in this embodiment referred to as a "odyssey", whereby the user accesses a sequentially linked set of musical audio tracks, for example a recommended playlist. A plurality of such odysseys are accessible by the user via the movie. When experiencing an odyssey, the "current odyssey", the user may interact with other users, at other client terminals, who are also experiencing the same odyssey. The odysseys represent a product catalogue, in that a user may navigate through the odysseys, obtain product information in the form of sample audio tracks, and graphical and textual information about products on offer. A user may also add products, in the form of music albums, to an on-line shopping basket, whilst navigating through an odyssey. When desired, the user can "check out" to order products present in their shopping basket. When the user encounters another user during an odyssey, the user may identify that other user and communicate with that user regarding the products on offer, in this case music albums.

Another type of virtual space provided by the movie is referred to in this embodiment as a "dimension". A dimension is a virtual space in which a selection of multimedia content not related to the current odyssey is available to the user. When inhabiting a dimension, the "current dimension", the user is able to interact with other users inhabiting the same dimension.

A user may simultaneously experience a selected odyssey and a selected dimension. The user may navigate between dimensions whilst remaining in the same odyssey. Similarly, a user may navigate between odysseys while remaining in the same dimension. In effect, a dimension is a virtual space containing representations of and links to primarily non-audio content, and an odyssey is a musical experience which occurs within a virtual space which may be shared with other users. Representations of and information relating to other users sharing a virtual space is available in the context of both a dimension and an odyssey.

Figure 2:
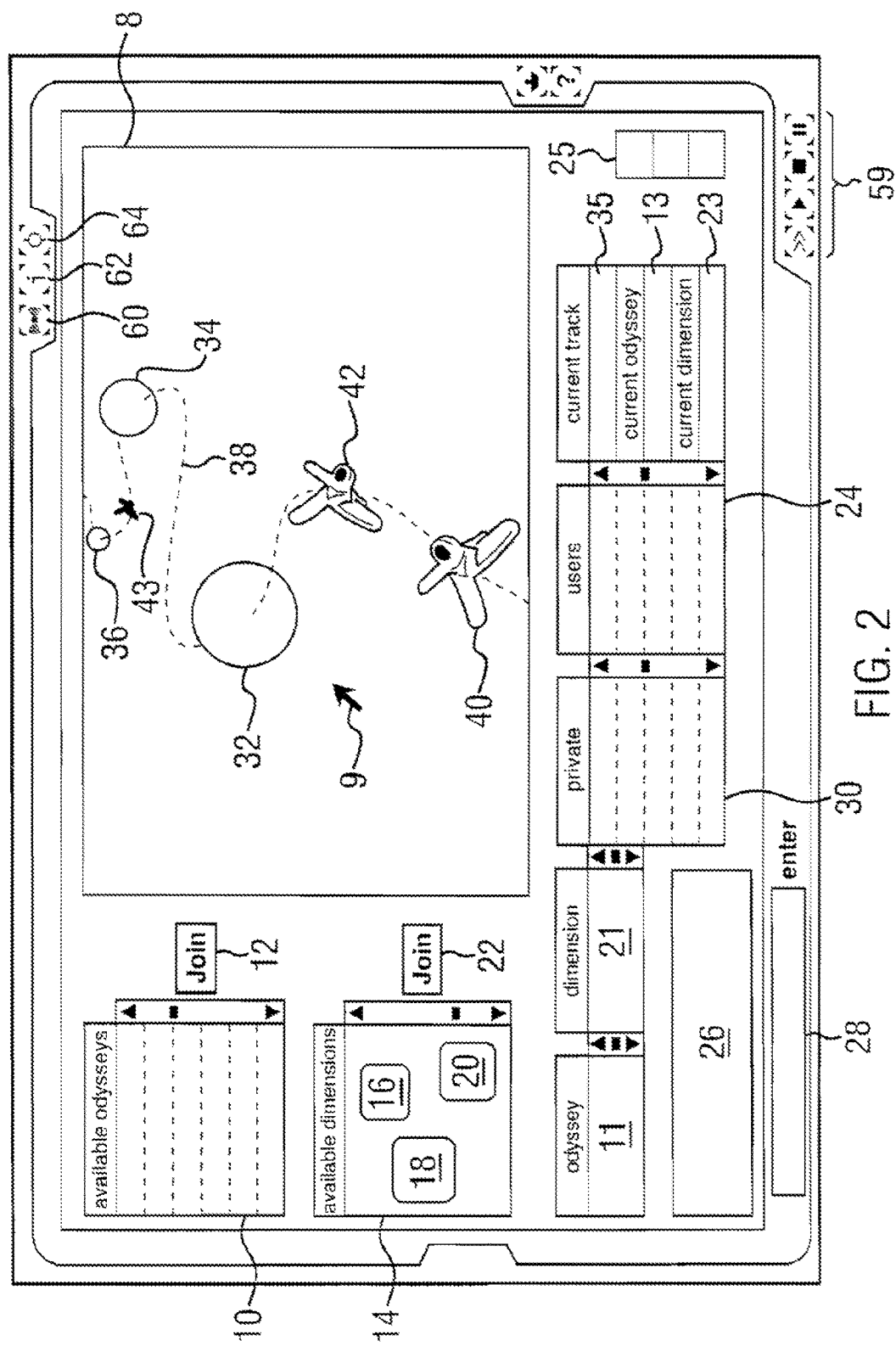
FIGS. 2 to 8 are schematic illustrations of screen shots from a graphical user interface provided in this embodiment of the invention.

FIG. 2 shows a graphical user interface provided in this embodiment, in which the user's current odyssey is represented in a first type of virtual space.

The graphical user interface includes a window 10 listing all available odysseys in a selectable format. In order to select a given odyssey, the user clicks on the selected odyssey in the window 10, using cursor 9, and then selects the associated join button 12. When the user selects a given odyssey in the window 10, information regarding the odyssey is shown in odyssey descriptor window 11. The currently selected odyssey is shown in current odyssey box 13.

Window 14 provides access to all the dimensions available to the user. The dimensions are represented as a plurality of image objects 16, 18, 20 . . . . In order to select a given dimension, the user clicks on the appropriate image object and then selects the associated join button 22. When the user selects a given dimension in the window 14, information regarding the dimension is shown in dimension descriptor window 21. The currently selected dimension is shown in current dimension box 23.

The graphical user interface also includes a user list window 24, providing a selectable list of a subset of the other users currently logged on to the server 6. The user list is restricted by the selection of odyssey and/or dimension chosen by the user. Namely, only users experiencing the same odyssey and/or users present in the same dimension as the user appear in user list window 24.

Textual chat messages generated by other users listed in user list window 24 appear in chat box 26, whilst textual chat messages may be generated by the user in entry box 28, and posted to all other users in the user list. If the user wishes to hold a private chat with any of the users listed in user list window 24, the user may select the appropriate user from the user list and invite them to a private chat. In such a case, the co-participants in the private chat appear in private list window 30, and chat boxes 26 and 28 are used to display and post messages solely amongst the private user list.

A buddy window 25 indicates to the user when other users whom the user has previously registered a special interest in are currently logged on to the server 6. Different buddies are indicated conveniently by a box having unique position and/or colour within buddy list window 25. The user may invite a buddy to a private chat by clicking on the appropriate box when present in window 25.

Referring now to virtual space window 8, in the type of virtual space illustrated in FIG. 2, the user's current odyssey is represented in the form of a sequence of image objects, in this embodiment images of virtual planets, 32, 34 and 36, interlinked by a journal path 38, which in this embodiment passes through virtual outer space. Each planet image 32, 34 and 36 represents one of the audio tracks in the link list of audio tracks of the current odyssey. The user himself is illustrated as an avatar 40 located along the journey path 38 in accordance with the current track the user is listening to and with a distance between the planets in accordance with the current temporal location of the user within the current audio track. The current audio track is also indicated in current track box 35. Once a user joins an odyssey, the virtual space type illustrated in FIG. 2 is shown on the graphical user interface, whilst streamed audio data is also sent from the server 6 to the user's client terminal, and played to the user via the client terminal's audio transmission means. The track which is currently played to the user via the audio transmission means is illustrated in virtual space window 8 as the planet image 32 appearing immediately in front of the user's avatar 40. As the audio track progresses from finish to end, the user's avatar 40 moves forward along the journey path 38 towards the planet image 32. Once the current track is ended, the next track of the sequential track list is streamed and played to the user and the user's avatar passes the planet image 32 and moves along the journey path 38 towards the next planet image 34. As the user's avatar 40 approaches a planet, the image of the planet enlarges, sized in accordance with perspective in relation to the user's avatar 40 and the planet image, thus providing the user with an indication as to how far the audio track has progressed.

Figure 4:
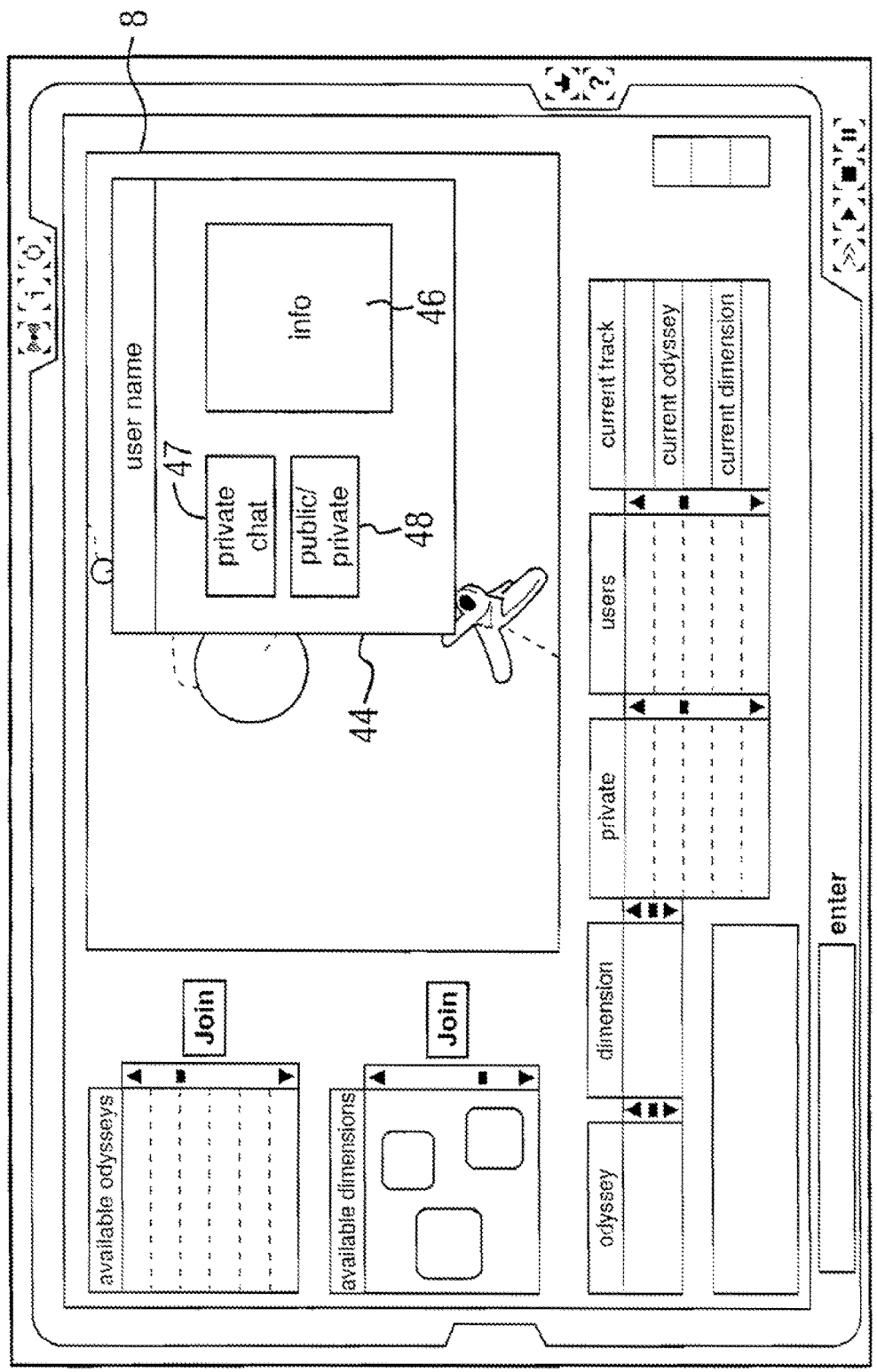

Other users of the system currently experiencing the same odyssey as the user are also represented in virtual space window 8 by means of an avatar 42, 43 . . . . Thus, each user on the same odyssey is represented by a different avatar. Each user has a default avatar, such as that illustrated in FIG. 2. However, a user may select an avatar from a selection stored on the server 6 or may upload their own unique avatar to the server 6 for distribution to other users. The temporal location of other users within the same odyssey is also indicated by appropriate positioning of their avatar 42, 43 . . . along the journey path 38. The other avatars 42, 43 . . . are also sized in accordance with perspective in relation to the distance between the user's avatar 40 and the other avatars. Thus, a user can readily identify other users listening to the same track, or other tracks within the same odyssey. The user may click on to another user's avatar 42, 43 . . . , in which case the selected other user's individual details, stored on server 6, are displayed to the user, as shown in FIG. 4, on the graphical user interface. The user's details are in the form of a personal card 44, containing personal information 46 and a private chat button 47 to invite the user to a private chat. The two, or more users, may thus discuss the track they are listening to, and the other tracks in the odyssey, to help determine whether they wish to make a purchase. The card 44 also includes a button 48 allowing the user to select between the other user's public details and private details. The user is only allowed access to the other user's private details by entry of an appropriate password unique to the other user.

Figure 9:
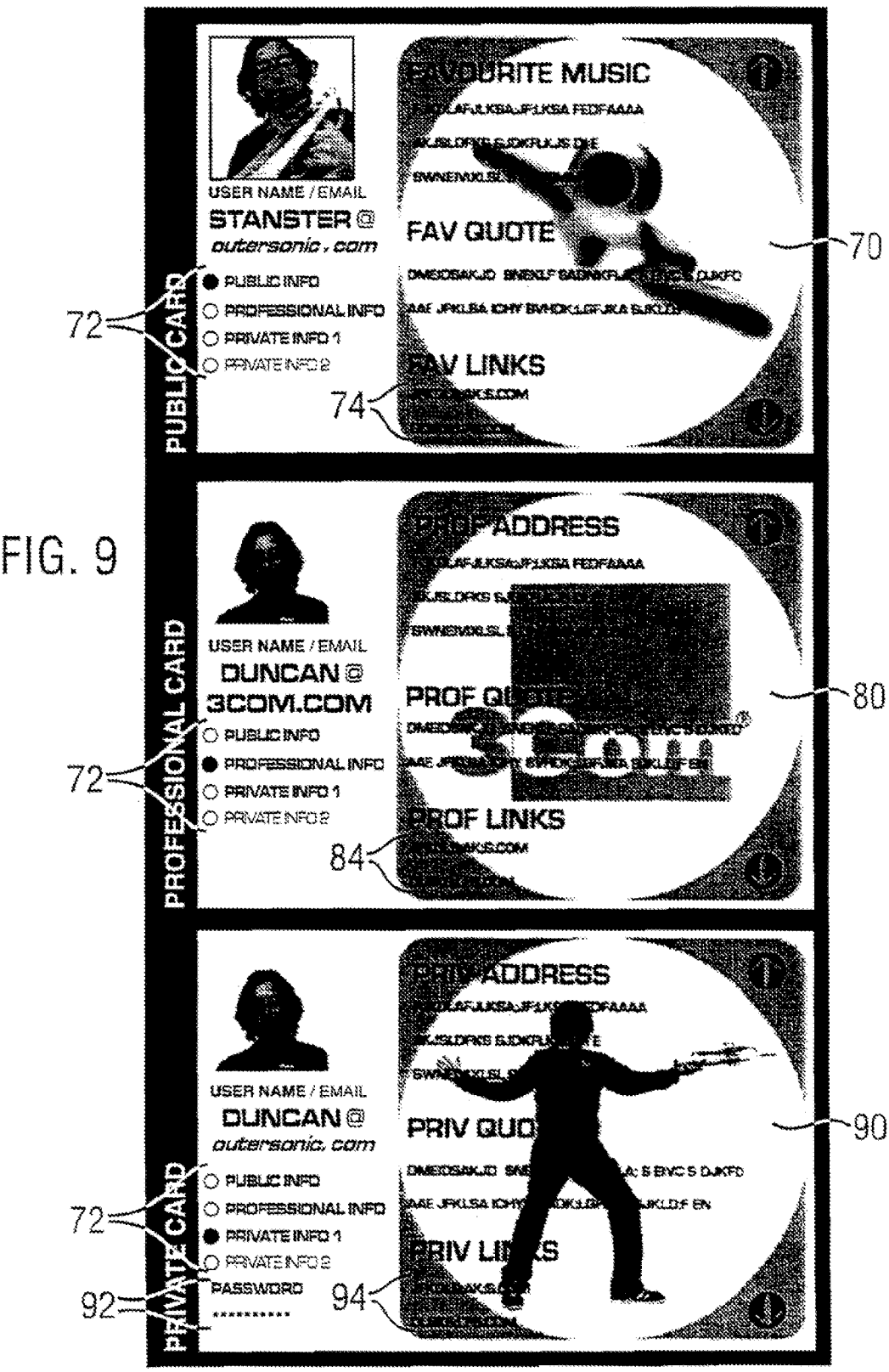
FIG. 9 is an illustration of different personal details cards which a user may access when using a system of the present invention.

FIG. 9 illustrates another embodiment of public and private card which may be provided when a user selects another user's avatar. A public card 70 provides details openly, as does a professional card 80, which each include different information individual to the user, including different selected images. A user may also have one or more private cards 90, each displaying different information. Each private card requires entry of a password in a box 92 provided before the associated information is displayed. To select between different cards, a user clicks on radio buttons 72. Each card may include different selected Web links 74, 84, 94, as desired. These public and private web cards are the same as would be used as beamable business and/or personal cards for palm pilots and Psion™ pda's.

Figure 3:
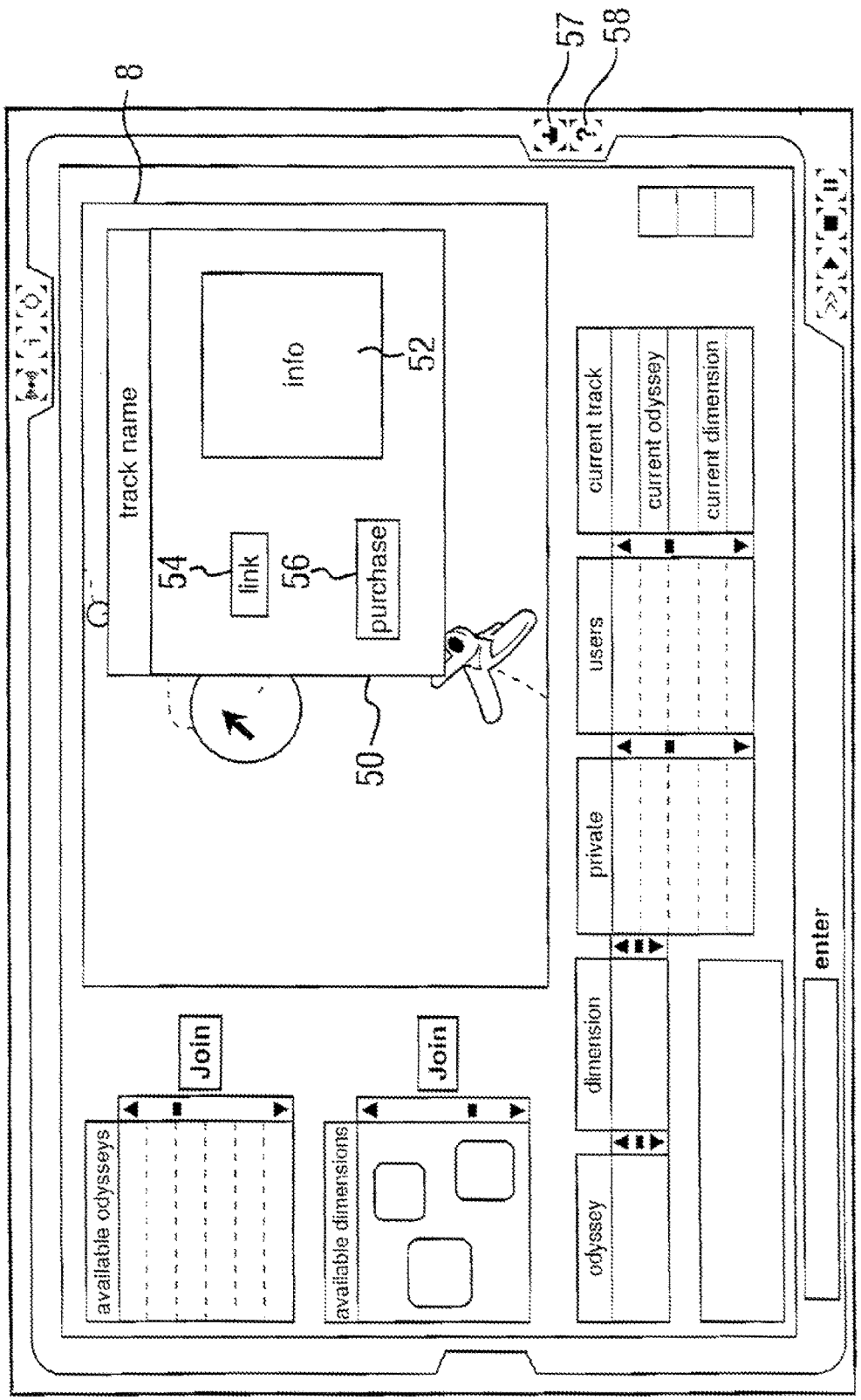

The user may obtain additional details regarding the track currently being played to the user by clicking on the closest planet image 32, or regarding other tracks further on in the odyssey sequence by clicking on other planet images in the virtual space window 8. On such selection, the user is displayed a track card 50 as shown in FIG. 3, on the graphical user interface. The track card includes information 52 about the track, a link button 54 providing a hyperlink to a Web resource stored on server 6 related to the track in question, its associated product, in this embodiment a music album, in a form such as a compact disc or an on-line data download, containing the track name in question, and a purchase button 56. On selection of the purchase button, the user is presented with a window describing purchase information for the related product, including its price. The user is also presented with the option of adding the product to their on-line shopping basket. At any stage, the user may access their current shopping basket, through shopping basket button 57, located adjacent a general help button 58, and proceed to make an on-line purchase by selecting a "check out" option. The user is then connected to e-commerce enabled Web resources, stored on server 6, or linked to a separate on-line music ordering Web site, allowing the on-line purchase of their selected product or products.

The user may navigate through the odyssey by means of audio control buttons 59, including a play button, a pause button, a stop button and a fast forward button. Selection of one of the audio control options not only controls the audio output from the user's terminal, but also controls the navigation of the user's avatar 40 within the odyssey displayed in virtual space window 8.

Not all planet images within the current odyssey are represented concurrently in virtual space window 8 in the type of virtual space illustrated in FIG. 2, which has a pseudo-3D format. In order to view all of the current audio tracks at once, and thus access information conveniently about the audio tracks in the current odyssey, by clicking 2D odyssey button 62 the user selects a different type of virtual space representing the current odyssey, as illustrated in FIG.

5, in a 2D format. The user may always return to the pseudo 3D format by clicking on 3D odyssey button 60.

Figure 5:
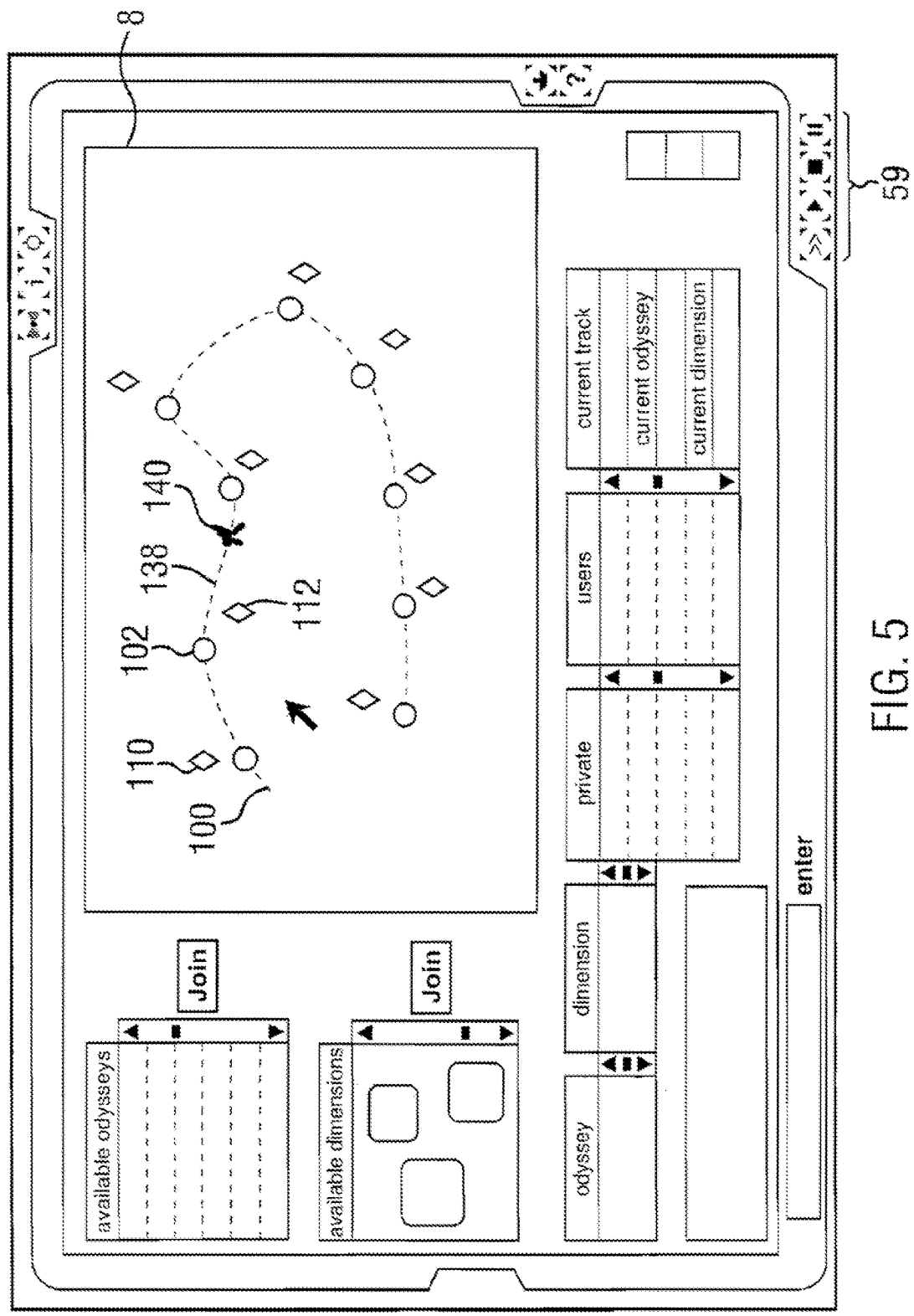
Figure 6:
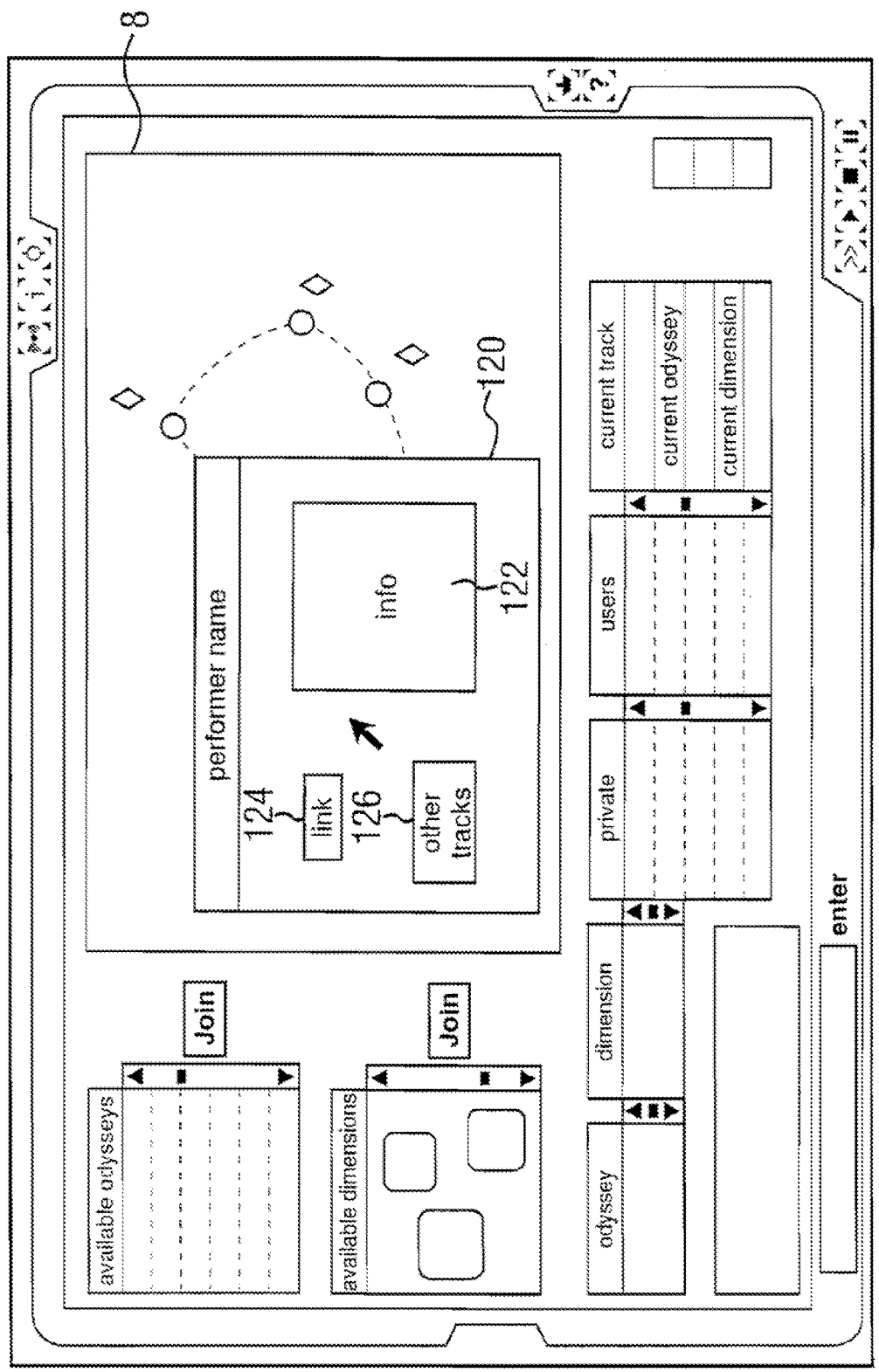
Figure 7:
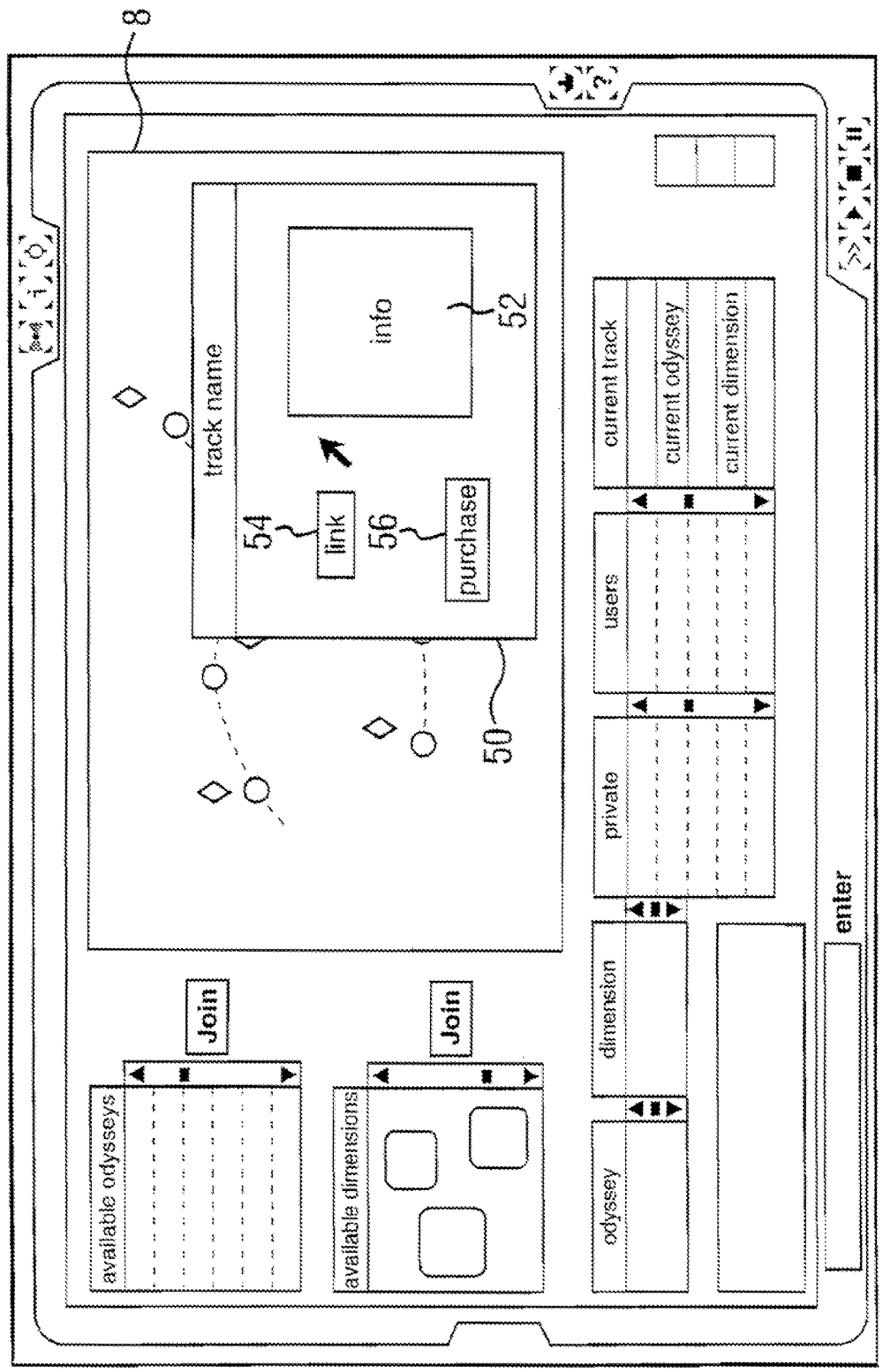

As shown in FIG. 5, in this type of virtual space the entire odyssey is represented as a static collection of images of planets 100, 102 . . . connected by the journey path 138. Adjacent each planet image 100, 102 . . . is an image object, in this embodiment a star image 110, 112 . . . , whereby access to information regarding the performing artist for the corresponding track is accessed. When a user clicks on a star image 110, 112 . . . , a performer name card 120 is shown within the graphical user interface. The performer name card includes information 122 about the performer, a link button 124 whereby access to other Web resources resident on server 6 is performed by selection, and a button 126 whereby access to information regarding other audio tracks for the same performer which are available in this, or other odysseys, is given. If a user selects a planet image 100, 102 . . . , a track name information card, similar to that described in relation to FIG. 3, is shown on a graphical user interface, as shown in FIG. 7.

The current temporal location of the user within the odyssey, in terms of the audio tracks, is also illustrated in this type of virtual space, by means of an avatar 140 representing the user appropriately located along the journey path 138.

Figure 8:
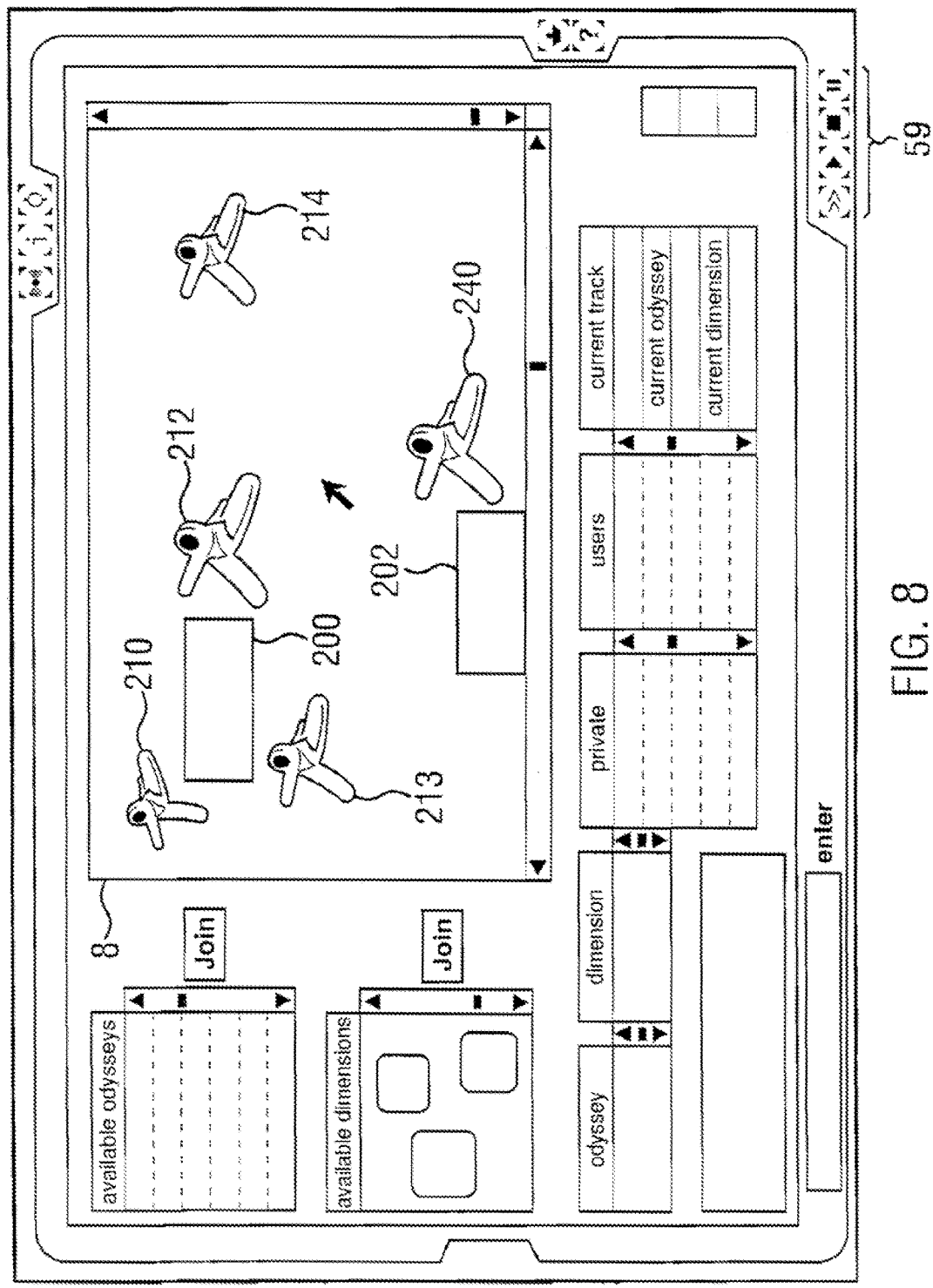

By clicking on dimension button 64, the user may also select a further different type of virtual space, representing the dimension in which the user currently exists, as shown in FIG. 8. In this type of virtual space, the user is represented as an avatar 240, and the user has access to various multimedia resources not related to the audio tracks of the current odyssey. The user is played audio tracks according to the user's current position in their current odyssey, whilst the user may access other types of information via the dimension virtual space.

The dimension virtual space includes a plurality of image objects representing resources permanently available within the dimension, including text and image files. The user may access data by double clicking on an appropriate image object 200, 202, . . . , whereby the associated Web resources, such as HTML, pages and/or image files, are accessed and displayed in the graphical user interface. Upon access to the resources associated with an image object, the user's avatar is represented as adjacent the image object in question on the graphical user interfaces of other users in the system. The user may also select an image object, and thereby display an interest in the subject-matter of the resources associated with the image object, without currently accessing the resources, by single-clicking on the image object in which case the user's avatar 240 is represented as adjacent the selected image object, both on the user's graphical user interface (as shown in FIG. 8, the user's avatar is represented adjacent the image object 202) and on the graphical user interfaces of other users of the system. As shown in FIG. 8, the avatars 212, 213 and 210 of other users of the system are represented adjacent image object 200, indicating that those users are accessing or registering an interest in the associated resources. On the other hand, a user not accessing or registering an interest in a particular resource is represented by an avatar 214 located relatively distant from any image object 200, 202, . . . . As in the case previously described in relation to FIG. 4, the user can access personal details, and initiate a private chat, by clicking on the avatar of another user, in which case a personal card similar to that illustrated in FIG. 4 is displayed within the graphical user interface.

It is to be appreciated that selection of the type of virtual space in virtual space window 8 only affects the graphical user interface displayed to the user, and does not affect playback of the audio bitstream for the odysseys. The audio playback is controlled by means of audio playback control buttons 58 in each type of virtual space.

It is also to be appreciated that various modifications and variations may be employed in relation to the above-described embodiment. For example, whilst in the above embodiment the multi-user control on the graphical user interface is implemented by a customized program (the Shockwave™ movie) resident on the client side interworking with a customized control program on the server side during access to the multimedia content, in an alternative embodiment the multi-user control on the graphical user interface may be implemented solely by a multi-user control program resident on the server side, and updated on the client side by data sent to the user in standard browser-readable format.

Whilst in the above-described embodiment the product catalogue is a music catalogue and the virtual space is represented as virtual outer space, various alternatives are also envisaged. For example, the product catalogue may be a wine catalogue and the virtual space generated by the Shockwave movie may be in the form of a virtual vineyard, in which users navigate through and select individual grape vines in order to access and order specific wine products on offer, whilst interacting with other users in the same manner as described above. The audio streaming aspects of the invention may, or may not be implemented. Where the products on offer are not audio-related, the provision of audio content may not be desired.

The invention claimed is:

1. A method of presenting an on-line catalogue of audio tracks to a user in a data networked computer apparatus, the method comprising:

providing a graphical user interface on the computer apparatus;

operating the graphical user interface with the computer apparatus to represent a virtual space, wherein the virtual space is a visual representation of a space through which users may navigate along a given journey path;

the virtual space including product representations, each product representation visually representing an audio track in a sequentially linked set of audio tracks, wherein the product representation is selectable by a user to obtain product information about the audio track and/or purchase the audio track on-line;

the product representations being arranged by the computer apparatus on the graphical user interface as a sequence thereof representing the sequentially linked set of audio tracks and interlinked by the given journey path;

operating the graphical user interface with the computer apparatus to present user representations positioned along the given journey path, wherein the user representations represent other current users of the system who are listening to the sequentially linked set of audio tracks, through which the user may identify such other current users and select another current user for communication regarding one or more of the audio tracks, and wherein the user representations comprise avatars and include an avatar representing the user; and operating the graphical user interface with the computer apparatus to move the user's avatar within the virtual space in accordance with a temporal listening location in a current audio track being played by the user.

2. A method according to claim 1, wherein one or more of the user representations are represented in a relationship with a first product representation in the virtual space when selecting a first audio track or accessing information relating to the first audio track, and represented in a relationship with a second product representation in the virtual space when selecting a second product or accessing information relating to the second product.

3. A method according to claim 2, wherein in the relationships with the one or more user representations are represented as spatially proximate to the first or second product representations representing the respective first or second audio track to which the other current user is listening, compared to such proximity with product representations of other audio tracks in the sequentially linked set of audio tracks.

4. A method according to claim 1, wherein the product representations comprise image objects.

5. A method according to claim 1, the method including generating a graphical user interface representing a plurality of different virtual spaces, each of the different virtual spaces being independently selectable.

6. A method according to claim 1, wherein the user representations include a user's representation representing the user, and further comprising moving the user's representation along the journey path within the virtual space in accordance with the user's temporal listening location in the sequentially linked set of audio tracks.

7. A method according to claim 6, further comprising moving the user representations of other current users of the system along the journey path within the virtual space in accordance with the other current user's temporal listening location within the sequentially linked set of audio tracks.

8. A method according to claim 6, further comprising adjusting a relative size of a product representation representing a current audio track on the journey path in the virtual space in accordance with the temporal listening location within the current audio track so as to provide a visual appearance of approaching the respective product representation along the journey path as the current audio track plays.

9. A method according to claim 1, further comprising operating the graphical user interface to provide at least one audio control selectable by the user to simultaneously navigate through the virtual space and the sequentially linked set of audio tracks.

10. A method according to claim 1, further comprising streaming audio data to the data networked computer apparatus.

11. A method according to claim 1 wherein information about the other current user of the system is presented by displaying on the graphical user interface ID information identifying a the other current user in response to selection of the corresponding user representation, the ID information including image and text information, and having a plurality of user selectable and separately viewable parts including different information.

12. A non-transient computer readable medium programmed with computer readable code embodying a computer program for use with an on-line catalogue of audio tracks to be implemented in a data-networked computer apparatus, the program being adapted to:
generate a graphical user interface representing a virtual space, wherein the virtual space is a visual representation of a space through which users may navigate along a given journey path;
the virtual space including product representations, each product representation visually representing an audio track in a sequentially linked set of audio tracks, wherein the product representation is selectable by a user to obtain product information and/or purchase the audio track on-line;
the product representations being arranged along the given journey path within the virtual space as a sequence thereof representing the sequentially linked set of audio tracks and interlinked by the given journey path; and
user representations representing other current users of the system and positioned along the given journey path, wherein the user representations represent other current users of the system who are listening to the sequentially linked set of audio tracks, through which the user may identify such other current users and select one or more of the other users for communication regarding the one or more of the audio tracks, and wherein the user representations comprise avatars and include an avatar representing the user, and further comprising moving the user's avatar within the virtual space in accordance with a temporal listening location in a current audio track being played by the user.

13. A non-transient computer readable medium programmed with computer readable code according to claim 12, the program being further adapted to adjust a relative size of a product representation representing a current audio track on the journey path in the virtual space in accordance with the temporal listening location within the current audio track so as to provide a visual appearance of approaching the respective product representation along the journey path as the current audio track plays.

14. A non-transient computer readable medium programmed with computer readable code according to claim 13, wherein the user representations include a user's avatar representing the user, and the program being further adapted to adjust a spatial relationship within the virtual space between the user's avatar and the product representation representing the current audio track in accordance with the temporal listening location within the audio track.

15. A non-transient computer readable medium programmed with computer readable code according to claim 13, the program being further adapted to adjust a spatial relationship within the virtual space between the user representations of other current users within the virtual space in accordance with temporal listening locations within the audio track of the respective other current user.

\* \* \* \* \*